(12) United States Patent
Kwak et al.

(10) Patent No.: US 12,467,763 B2
(45) Date of Patent: Nov. 11, 2025

(54) METHOD AND SYSTEM OF GENERATING LOCAL MAP FOR TRAVEL CONTROL OF MOBILITY

(71) Applicants: Hyundai Motor Company, Seoul (KR); Kia Corporation, Seoul (KR)

(72) Inventors: Dong Hwan Kwak, Hwaseong-si (KR); Sanghyeon Oh, Seoul (KR); Hyuntek Lim, Hwaseong-si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 87 days.

(21) Appl. No.: 18/629,060

(22) Filed: Apr. 8, 2024

(65) Prior Publication Data

US 2025/0137806 A1 May 1, 2025

(30) Foreign Application Priority Data

Oct. 31, 2023 (KR) .......................... 10-2023-0147709

(51) Int. Cl.
*G01S 17/89* (2020.01)
*G01C 21/00* (2006.01)
*G06V 10/44* (2022.01)
*G06V 10/762* (2022.01)
*G06V 20/56* (2022.01)

(52) U.S. Cl.
CPC .......... *G01C 21/3804* (2020.08); *G01S 17/89* (2013.01); *G06V 10/44* (2022.01); *G06V 10/762* (2022.01); *G06V 20/56* (2022.01)

(58) Field of Classification Search
CPC .. G01C 21/3804; G06V 10/762; G06V 10/44; G06V 20/56; G01S 17/89
See application file for complete search history.

(56) References Cited

U.S. PATENT DOCUMENTS

2021/0397195 A1 12/2021 Toshev et al.
2021/0405649 A1 12/2021 Eoh et al.

FOREIGN PATENT DOCUMENTS

KR 20220002758 A 1/2022
KR 20230018656 A 2/2023

*Primary Examiner* — Mathew Franklin Gordon
(74) *Attorney, Agent, or Firm* — Slater Matsil, LLP (57) ABSTRACT

An embodiment method of generating a local map for travel control of a mobility includes loading the local map from an entire map stored in a memory, wherein the local map includes at least a portion of the entire map, acquiring a two-dimensional (2D) light detection and ranging (LiDAR) point data from a LiDAR mounted on the mobility, acquiring a three-dimensional (3D) feature point data by receiving a front image of the mobility from a camera mounted on the mobility, reducing a dimension of the 3D feature point data to a 2D feature point data, binding the 2D feature point data to the 2D LiDAR point data, and publishing the 2D feature point data bound to the 2D LiDAR point data on the local map.

20 Claims, 5 Drawing Sheets

METHOD AND SYSTEM OF GENERATING LOCAL MAP FOR TRAVEL CONTROL OF MOBILITY

CROSS-REFERENCE TO RELATED APPLICATIONS

This application claims the benefit of Korean Patent Application No. 10-2023-0147709, filed on Oct. 31, 2023, which application is hereby incorporated herein by reference.

TECHNICAL FIELD

The present disclosure relates to a method and a system of generating a local map for travel control of a mobility.

BACKGROUND

A simultaneous localization and mapping (SLAM) may refer to technology in which a mobility measures its current position while searching an unknown environment and simultaneously mapping a surrounding environment.

A conventional SLAM performed based on an autonomous traveling mobility for an indoor environment may generate a map by acquiring spatial information by using a stereo vision, a LiDAR, or the like, and then calculating movement information by using a position detection sensor such as an encoder or an inertial sensor. However, the conventional SLAM may generate an incorrect map because a sensor for configuring the spatial information such as the stereo vision or the LiDAR may be sensitive to illuminance and may lack a resolution. As a result, a collision of the mobility may occur.

For example, a chair or a table with thin legs may be disposed indoors. In this case, even in a case of detecting the thin legs by the LiDAR, the thin legs may be treated as noise such that most of the legs may be deleted by correction in a map generation process. As such a topographical feature is lost, it may be difficult to perform the SLAM in an indoor space, such as an office, having many similar spatial structures.

Meanwhile, the SLAM typically using an artificial neural network may require a control board having high computing power and a memory having large capacity. Therefore, the SLAM using the artificial neural network may have high costs for its hardware and software configuration to be applied to the mobility moving at a low speed and performing a simple task in the indoor environment such as a parking lot.

The above information disclosed in this background section is provided only to assist in a better understanding of the background of the present disclosure, and it may thus include information not included in the already known prior art.

SUMMARY

The present disclosure relates to a method and a system of generating a local map for travel control of a mobility. Particular embodiments relate to a method and a system of generating a local map for travel control of a mobility, for example, path generation of the mobility by binding feature points observed by a camera to two-dimensional (2D) light detection and ranging (LiDAR) points and publishing the bound feature points on the local map.

Embodiments of the present disclosure provide a method and a system of generating a local map for travel control of a mobility which may perform the travel control of the mobility by binding feature points observed by a camera with 2D LiDAR points and publishing the bound feature points on the local map.

A method of generating a local map for travel control of a mobility according to an embodiment may include loading, by a controller, the local map which is at least a portion of an entire map from the entire map stored in a memory, acquiring, by the controller, a 2D LiDAR point data from a LiDAR mounted on the mobility, acquiring, by the controller, a three-dimensional (3D) feature point data by receiving a front image of the mobility from a camera mounted on the mobility, reducing, by the controller, a dimension of the 3D feature point data to a 2D feature point data, binding, by the controller, the 2D feature point data to the 2D LiDAR point data, and publishing, by the controller, the 2D feature point data bound to the 2D LiDAR point data on the local map.

The method may further include generating, by the controller, a path of the mobility by using the local map on which the 2D feature point data bound to the 2D LiDAR point data is published.

The method may further include deleting, by the controller, a non-collision 3D feature point data which does not collide with the mobility from the 3D feature point data before the dimension of the 3D feature point data is reduced to the 2D feature point data.

Before the dimension of the 3D feature point data is reduced to the 2D feature point data, the method may further include clustering, by the controller, the 3D feature point and deleting, by the controller, an outlier feature point which is not clustered from the 3D feature point data.

A specification of the mobility may be stored in the memory. The observed non-collision 3D feature point data may be selected based on the specification of the mobility.

The feature point data bound to the LiDAR point data and published on the local map may not be deleted from the local map even when the feature point data deviates from a camera view.

The feature point data bound to the LiDAR point data and published on the local map may be deleted from the local map when a distance between the mobility and the feature point is greater than or equal to a predetermined distance or when power of the mobility is turned off.

A system of generating a local map for travel control of a mobility according to another embodiment may include a LiDAR mounted on the mobility and configured to detect a 2D LiDAR point data, a camera mounted on the mobility and configured to acquire a front image of the mobility, and a controller configured to load the local map which is at least a portion of an entire map from the entire map stored in a memory, receive the 2D LiDAR point data from the LiDAR, receive the image from the camera, acquire a 3D feature point data in the image, reduce a dimension of the 3D feature point data to a 2D feature point data, bind the 2D feature point data to the 2D LiDAR point data, and publish the 2D feature point data bound to the 2D LiDAR point data on the local map.

The controller may be further configured to generate a path of the mobility by using the local map on which the 2D feature point data bound to the 2D LiDAR point data is published.

The controller may be further configured to delete a non-collision 3D feature point data which does not collide with the mobility from the 3D feature point data before the dimension of the 3D feature point data is reduced to the 2D feature point data.

Before the dimension of the 3D feature point data is reduced to the 2D feature point data, the controller may be further configured to cluster the 3D feature points and delete an outlier feature point which is not clustered from the 3D feature point data.

A specification of the mobility may be stored in the memory. The controller may be configured to select the observed non-collision 3D feature point data based on the specification of the mobility.

The feature point data bound to the LiDAR point data and published on the local map may not be deleted from the local map even when the feature point data deviates from a camera view.

The feature point data bound to the LiDAR point data and published on the local map may be deleted from the local map when a distance between the mobility and the feature point is greater than or equal to a predetermined distance or when power of the mobility is turned off.

As set forth above, embodiments of the present disclosure may acquire relatively accurate environment data at relatively low cost by binding the feature points observed with the camera to the 2D LiDAR points and publishing the bound feature points on the local map. In addition, embodiments of the present disclosure may reduce the possibility of a collision occurring between the mobility and the surrounding environment by performing the travel control of the mobility, such as the path generation of the mobility, by using the relatively accurate environment data.

Unlike the simultaneous localization and mapping (SLAM) using the artificial neural network, embodiments of the present disclosure may bind the 2D LiDAR points with the feature points observed by the camera, thus acquiring the accurate environment data without any complex computation. Therefore, embodiments of the present disclosure may not require any control board having advanced computing power and may also be executed by the central processing unit (CPU) mounted on the conventional mobility.

In addition, embodiments of the present disclosure may maintain the feature points bound to the 2D LiDAR points even when the feature points are out of a camera view to thus prevent the frequent computation for binding the feature points and publish the feature points bound to the 2D LiDAR points only on the temporary local map, thereby reducing the memory capacity requirements.

Other effects which may be acquired or predicted by the embodiments of the present disclosure are disclosed directly or implicitly in the detailed description of the embodiments of the present disclosure. That is, various effects predicted based on the embodiments of the present disclosure are disclosed in the detailed description described below.

BRIEF DESCRIPTION OF THE DRAWINGS

Embodiments in the specification may be better understood by referring to the following description in connection with the accompanying drawings in which like reference numerals refer to identical or functionally similar elements.

It should be understood that the drawings referenced above are not necessarily drawn to scale and present a rather simplified representation of various preferred features showing the basic principles of embodiments of the present disclosure. For example, specific design features of embodiments of the present disclosure, including a specific dimension, orientation, position, and shape, are determined in part by the particular intended application and environment of use.

DETAILED DESCRIPTION OF ILLUSTRATIVE EMBODIMENTS

A term used herein is only to describe a specific embodiment and is not intended to limit the present disclosure. A term of a singular number used herein is intended to include its plural number unless the context clearly indicates otherwise. It should also be understood that the terms "include" and/or "including," when used in the specification, specify the presence of the recited features, integers, steps, operations, elements, and/or components, and they do not exclude the presence or addition of one or more of other features, integers, steps, operations, elements, components, and/or groups thereof. A term "and/or" used herein includes any one or all combinations of the associated listed items.

A "mobility," "of a mobility," or other similar terms used herein may generally include a general land mobility including a passenger vehicle including a sport utility vehicle (SUV), a bus, a truck, various commercial vehicles, or the like, a marine mobility including various boats and ships, an aerial mobility including an aircraft, a drone, or the like, and any object that may be moved by receiving power from a power source. In addition, the "mobility," "of the mobility," or other similar terms used herein may be understood to include a hybrid mobility, an electric mobility, a plug-in hybrid mobility, a hydrogen-powered mobility, and another alternative fuel (e.g., fuel derived from a source other than petroleum) mobility. As mentioned herein, the hybrid mobility may include a mobility having two or more power sources, for example, a gasoline-powered and electric-powered mobility. The mobility according to embodiments of the present disclosure may include a manually-driven mobility as well as a mobility driven more or less autonomously and/or automatically.

Further, it is to be understood that one or more of methods described below or aspects thereof may be executed by at least one or more controllers. The term "controller" may refer to a hardware device including a memory and a processor. The memory may store program instructions, and the processor may be specifically programmed to execute the program instructions to perform one or more processes described below in more detail. The controller may control operations of units, modules, parts, devices, or a component similar thereto, as described herein. It is also to be understood that the methods described below may be executed by an apparatus including the controller in conjunction with one or more other components, as appreciated by those skilled in the art.

In addition, the controller of embodiments of the present disclosure may be implemented as a non-transitory computer-readable recording medium including executable program instructions executed by the processor. An example of the computer-readable recording medium may include a read only memory (ROM), a random access memory (RAM), a compact disk read only memory (CD-ROM), a magnetic tape, a floppy disk, a flash drive, a smart card, or an optical data storage device, and the present disclosure is not limited thereto. The computer-readable recording medium may also be distributed throughout a computer network, and the program instructions may thus be stored and executed in a distributed manner, for example, on a telematics server or a controller area network (CAN).

Hereinafter, embodiments of the present disclosure are described in detail with reference to the accompanying drawings.

Figure 1:
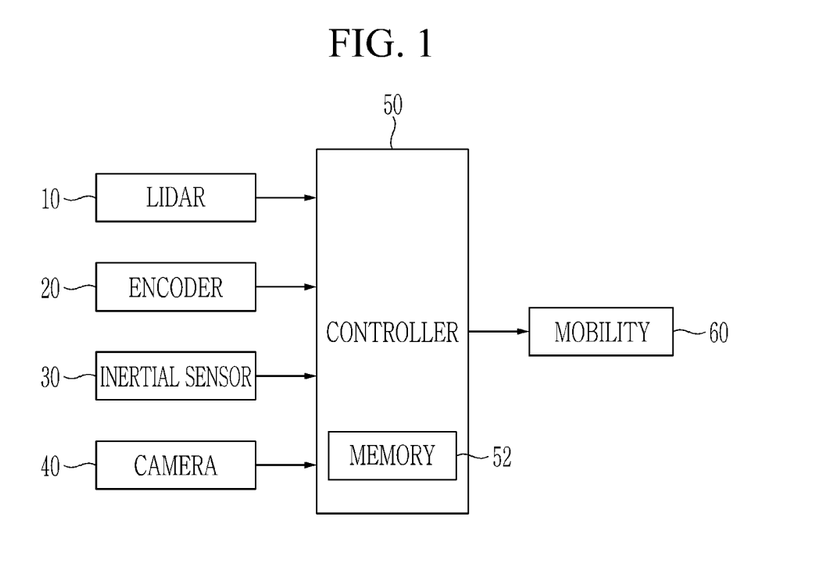
FIG. 1 is a block diagram of a system of generating a local map according to an embodiment of the present disclosure.

FIG. 1 is a block diagram of a system of generating a local map according to an embodiment of the present disclosure.

As shown in FIG. 1, the system of generating a local map according to an embodiment of the present disclosure may include a light detection and ranging (LiDAR) 10, an encoder 20, an inertial sensor 30, a camera 40, a controller 50, and a mobility 60.

Here, the "local map" may refer to a map for travel control of the mobility 60, for example, path generation of the mobility 60 and/or autonomous travel control of the mobility 60 based on the generated path. The local map may be loaded from an entire map, feature point data bound to two-dimensional (2D) light detection and ranging (LiDAR) point data may be added into the local map, and at least a portion of the local map or at least a portion of the feature point data bound to the 2D LiDAR point data in the local map may be deleted when satisfying a predetermined condition (e.g., a distance condition between the mobility 60 and the feature point or a power condition of the mobility 60). That is, the local map may refer to a map continuously generated for the travel control of the mobility 60 when power of the mobility 60 is turned on and may refer to the map in which at least a portion of the feature point data included in the local map is deleted when satisfying the predetermined condition.

The "entire map" may refer to a map which is a basis of the local map. The entire map may include the feature point data in a state of being bound to the 2D LiDAR point data or in a state of not being bound to the 2D LiDAR point data. The entire map or the feature point data in the entire map may not be deleted even when satisfying the distance condition between the mobility 60 and the feature point or the power condition of the mobility 60. That is, the feature point data may not be deleted from or added to the entire map unless an update event occurs such that the entire map is updated.

The LiDAR 10 may be mounted on the mobility 60, may emit a laser pulse in front of the mobility 60, and may then measure a return time of the laser pulse reflected from an object (for example, a fixed terrain and an obstacle) within a measurement range of the LiDAR 10 to thus detect information on the object, such as a distance from the LiDAR 10 to the object, and direction, speed, temperature, material distribution, concentration feature, or the like of the object. Here, the object may be another mobility, a person, a thing, a pillar, a wall, or the like that exists outside the mobility 60 and provided with the LiDAR 10, and embodiments of the present disclosure are not particularly limited to a type of the object. The LiDAR 10 may be connected to the controller 50 to detect the 2D LiDAR point data (e.g., 2D data of a plurality of LiDAR points) within the measurement range and then transmit the 2D LiDAR point data to the controller 50.

The encoder 20 may measure information on rotation of a drive motor or a wheel provided in the mobility 60. The encoder 20 may be connected to the controller 50 to thus transmit the information on the measured rotation of the drive motor or the wheel to the controller 50. The controller 50 may calculate movement data of the mobility 60, such as the movement speed and/or a movement distance of the mobility 60, based on the information on the rotation of the drive motor or the wheel.

The inertial sensor 30 may measure information on a movement situation of the mobility 60, including speed, direction, gravity, and acceleration of the mobility 60. The inertial sensor 30 may be connected to the controller 50 to thus transmit the information on the measured movement situation of the mobility 60 to the controller 50. The controller 50 may detect or supplement the movement data of the mobility 60 based on the information on the movement situation of the mobility 60.

Here, an example shows that both the encoder 20 and the inertial sensor 30 are used as movement data sensors detecting the movement data of the mobility 60. However, only one of the encoder 20 and the inertial sensor 30 may be used as the movement data sensor. In addition, the movement data sensor is not limited to the encoder 20 or the inertial sensor 30 and may be various sensors detecting the movement data of the mobility 60.

The camera 40 may be mounted on the mobility 60 and may acquire a front image of the mobility 60 within the measurement range of the camera 40. The camera 40 may be connected to the controller 50 to thus transmit the acquired image to the controller 50. The image may include pixel data including a plurality of pixels. Here, a size of the pixel data of the image may be N*M, where "N" and "M" may be natural numbers.

The controller 50 may receive the 2D LiDAR point data from the LiDAR 10, receive the information on the rotation of the drive motor or the wheel from the encoder 20, receive the information on the movement situation of the mobility 60 from the inertial sensor 30, and receive the front image of the mobility 60 from the camera 40.

The controller 50 may acquire 3D feature point data by searching for the object (e.g., 3D feature points) in the image through an object search algorithm based on the received image, delete non-collision 3D feature point data which cannot collide with the mobility 60 from the 3D feature point data, reduce a dimension of the 3D feature point data to the 2D feature point data through a known dimension reduction algorithm, and bind the 2D feature point data to the surrounding 2D LiDAR point data through a known binding algorithm (e.g., a factor graph).

The controller 50 may publish the 2D feature point data bound to the 2D LiDAR point data on the local map. The controller 50 may include a memory 52, and the local map on which the bound 2D feature point data is published may be stored in the memory 52. The controller 50 may generate a path of the mobility 60 based on the local map stored in the memory 52 and may perform the travel control of the mobility 60 based on the generated path.

For this purpose, the controller 50 may be equipped with one or more microprocessors, and the one or more microprocessors may be programmed to perform each step of a method of generating a local map according to another embodiment of the present disclosure.

The controller 50 may be connected to the mobility 60 and may generate the path of the mobility 60 or perform the travel control of the mobility 60 by using the local map generated according to the method of generating a local map according to another embodiment of the present disclosure. For example, the controller 50 may control the mobility 60 to follow the object or control the mobility 60 to avoid the object.

Figure 2:
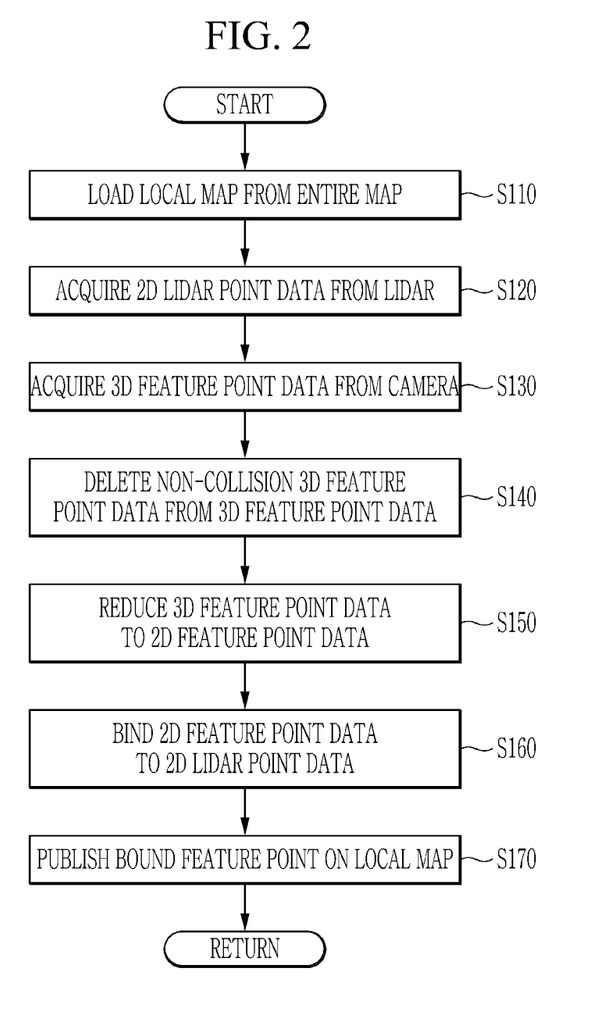
FIG. 2 is a flowchart of a method of generating a local map according to another embodiment of the present disclosure.
Figure 3:
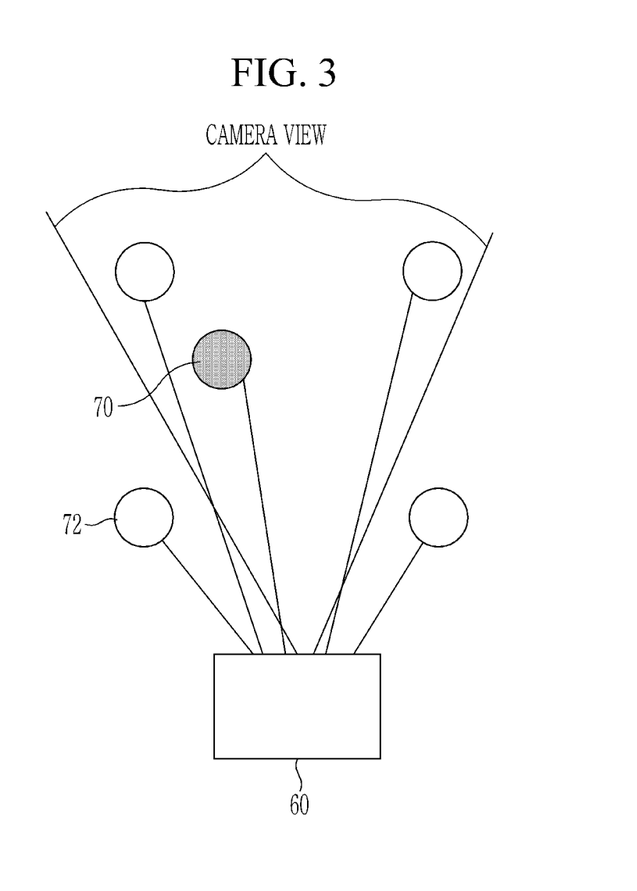
FIG. 3 shows two-dimensional (2D) light detection and ranging (LiDAR) point data detected by a LiDAR and three-dimensional (3D) feature point data acquired from a camera in one example.
Figure 4:
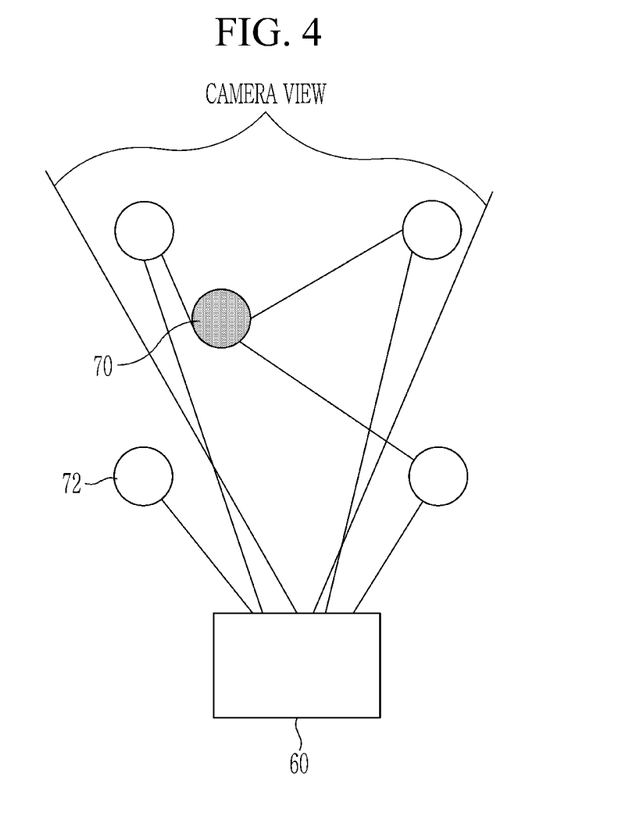
FIG. 4 shows 2D feature point data bound to the 2D LiDAR point data in one example.
Figure 5:
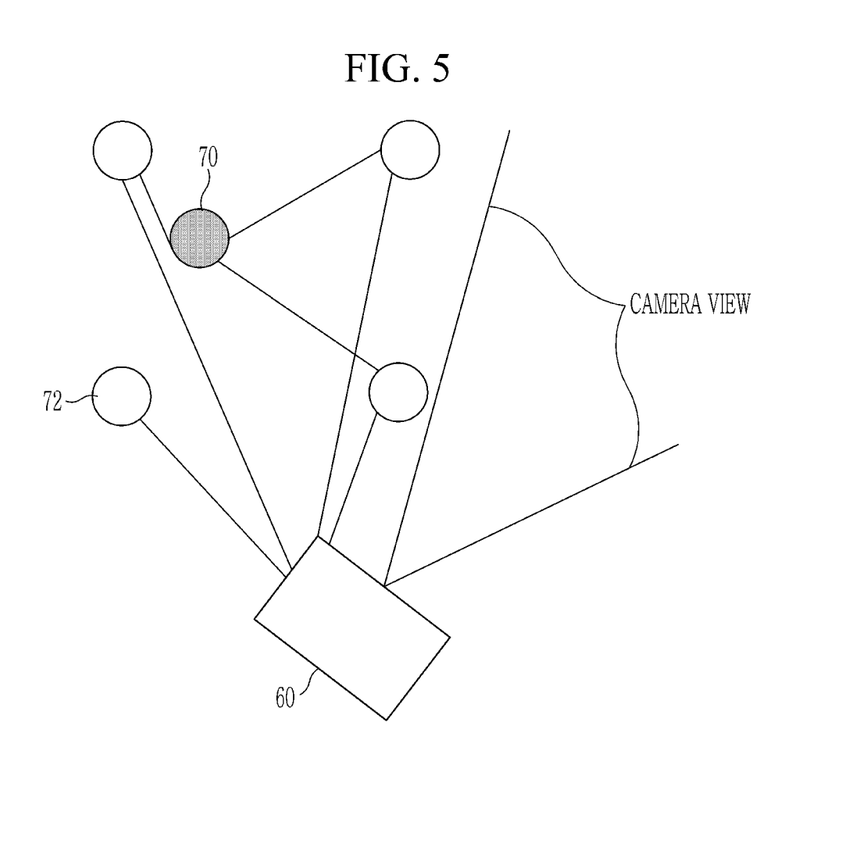
FIG. 5 shows an example where a camera view deviates from the 2D feature point data bound to the 2D LiDAR point data.

FIG. 2 is a flowchart of the method of generating a local map according to another embodiment of the present disclosure; FIG. 3 shows two-dimensional (2D) light detection and ranging (LiDAR) point data detected by a LiDAR and three-dimensional (3D) feature point data acquired from a camera in one example; FIG. 4 shows 2D feature point data bound to the 2D LiDAR point data in one example; and FIG. 5 shows an example where a camera view deviates from the 2D feature point data bound to the 2D LiDAR point data.

As shown in FIGS. 2 to 5, the method of generating a local map according to another embodiment of the present disclosure may start by loading the local map from the entire map at step S110. In an example, the entire map may refer to the map including the 2D feature point data of the object such as another mobility, a person, a thing, a pillar, a wall, or the like that exists outside the mobility 60 and the map that is not modified unless the update event occurs. The entire map is stored in the memory 52 and may not be erased or deleted even when the power supplied to the mobility 60 is turned off. In contrast, the local map may be extracted from the entire map. A region occupied by the local map may be the same as or smaller than a region occupied by the entire map. When the region occupied by the local map is smaller than the region occupied by the entire map, the local map may be loaded based on a position of the mobility 60. The local map may refer to the map for travel control of the mobility 60, for example, path generation of the mobility 60 and/or autonomous travel control of the mobility 60 based on the generated path. The feature point data bound to the 2D LiDAR point data may be added to the local map, and the at least a portion of the local map or the at least a portion of the feature point data bound to the 2D LiDAR point data may be deleted from the local map when satisfying the predetermined condition (e.g., the distance condition between the mobility 60 and the feature point or the power condition of the mobility 60). That is, the local map may refer to the map continuously generated for the travel control of the mobility 60 when the power of the mobility 60 is turned on and refer to the map in which the at least a portion of the feature point data included in the local map is deleted when satisfying the predetermined condition. The mobility 60 may add the feature point data bound to the 2D LiDAR point data to the local map, and the travel of the mobility 60 may be controlled based on the local map to which the feature point data is added.

The LiDAR 10 mounted on the mobility 60 may acquire the 2D LiDAR point data 72 at step S120 and transmit the acquired 2D LiDAR point data 72 to the controller 50. In addition, the camera 40 mounted on the mobility 60 may acquire the front image of the mobility 60 and transmit the acquired image to the controller 50. The controller 50 may acquire the 3D feature point data 70 in the image through the object search algorithm based on the received image at step S130. FIG. 3 shows an example showing the 2D LiDAR point data 72 acquired from the LiDAR 10 and the 3D feature point data 70 in the image acquired from the camera 40 or the 2D feature point data 70 acquired from the 3D feature point data 70.

When acquiring the 3D feature point data 70, the controller 50 may delete non-collision 3D feature point data which does not collide with the mobility 60 from the 3D feature point data 70 at step S140. Further, the controller 50 may delete an outlier feature point from the 3D feature point data 70 through a clustering algorithm for clustering the feature points. For example, the feature point above the highest point of the mobility 60 may be the non-collision feature point having no possibility of colliding with the mobility 60. Therefore, the controller 50 may reduce a computation amount by deleting the non-collision 3D feature point data having no possibility of colliding with the mobility 60 from the 3D feature point data 70. For this purpose, a specification of the mobility 60 (e.g., a wheel diameter or a maximum height of the mobility 60) may be stored in the memory 52, and the controller 50 may select the non-collision 3D feature point data based on the specification of the mobility 60. In addition, there is a high possibility that the feature point which is not clustered is noise, and the controller 50 may thus treat the non-clustered feature point as the outlier feature point and delete the same. The step S140 may be an optional step. The algorithm for deleting the non-collision feature point and the clustering algorithm for the feature points are well known to those skilled in the art, and a detailed description thereof will thus be omitted.

The controller 50 may reduce the dimension of the 3D feature point data 70, from which the non-collision 3D feature point data and/or the outlier 3D feature point data is deleted, to the 2D feature point data 70 at step S150. The dimension reduction algorithm for reducing the dimension of 3D data to that of 2D data is well known to those skilled in the art, and a detailed description thereof will thus be omitted. In this way, the controller 50 may reduce the computation amount and a memory requirement by excluding an unnecessary feature point before the dimension reduction.

The controller 50 may then bind the 2D feature point data 70 to the surrounding 2D LiDAR point data 72 by using the binding algorithm (e.g., the factor graph) at step S160. FIG. 4 shows examples of the 2D feature point data 70 bound to the 2D LiDAR point data 72. For example, the 2D feature point data 70 may be bound to the surrounding 2D LiDAR point data 72 of the feature point 70 according to a predetermined rule (e.g., rules for the distance and the direction between the feature point and the LiDAR point and/or the camera view). As shown in FIG. 4, four 2D LiDAR points 72 may be disposed around the 2D feature point 70, and the 2D feature point 70 may be bound to three 2D LiDAR points 72 among four 2D LiDAR points 72. In an example, through the binding algorithm, the feature point may be bound to the LiDAR point based on the distance and the direction between the feature point and the LiDAR point and/or the view of the camera 40, etc. The binding algorithm may be well known to those skilled in the art, and a detailed description thereof will thus be omitted.

The controller 50 may then publish the 2D feature point data 70 bound to the 2D LiDAR point data 72 on the local map at step S170. That is, the controller 50 may publish the feature point of the object that may interfere with the travel of the mobility 60 on the local map while this feature point is bound to the surrounding 2D LiDAR point. Accordingly, the controller 50 may generate the local map for the travel control of the mobility 60. The controller 50 may generate the path of the mobility 60 based on the generated local map and perform the travel control of the mobility 60 for the mobility 60 to follow the generated path.

Meanwhile, the feature point data 70 bound to the LiDAR point data 72 and published on the local map may not be deleted from the local map until the predetermined condition is satisfied. For example, as shown in FIG. 5, the feature point data 70 bound to the LiDAR point data 72 may not be deleted from the local map even when the mobility 60 changes its direction and the feature point 70 deviates from the view of the camera 40. The feature point data 70 may be reused based on a travel situation of the mobility 60, and accordingly, the feature point data 70 bound to the LiDAR point data 72 may not be deleted from the local map to reduce the computation amount.

In contrast, when the distance between the mobility 60 and the feature point 70 is greater than or equal to a predetermined distance, the feature point data 70 bound to the LiDAR point data 72 may be deleted from the local map even though the feature point 70 is within the camera view. In addition, the feature point data 70 bound to the LiDAR point data 72 may be deleted from the local map when the power of the mobility 60 is turned off. In this way, the controller 50 may reduce the memory requirement by deleting the feature point data 70 bound to the LiDAR point data 72 from the local map when the feature point data 70 bound to the LiDAR point data 72 of the LiDAR has currently a low possibility of being used to generate the path of the mobility 60.

Although the embodiments of the present disclosure have been described hereinabove, the scope of the present disclosure is not limited thereto, and all equivalent modifications easily modified by those skilled in the art to which the present disclosure pertains are intended to fall within the scope and spirit of the present disclosure.

What is claimed is:

1. A method of generating a local map for travel control of a mobility, the method comprising:
   loading the local map from an entire map stored in a memory, wherein the local map comprises at least a portion of the entire map;
   acquiring a two-dimensional (2D) light detection and ranging (LiDAR) point data from a LiDAR mounted on the mobility;
   acquiring a three-dimensional (3D) feature point data by receiving a front image of the mobility from a camera mounted on the mobility;
   reducing a dimension of the 3D feature point data to a 2D feature point data;
   binding the 2D feature point data to the 2D LiDAR point data; and
   publishing the 2D feature point data bound to the 2D LiDAR point data on the local map.

2. The method of claim 1, further comprising generating a path of the mobility by using the local map on which the 2D feature point data bound to the 2D LiDAR point data is published.

3. The method of claim 1, further comprising deleting a non-collision 3D feature point data from the 3D feature point data before reducing the dimension of the 3D feature point data to the 2D feature point data, wherein the non-collision 3D feature point data comprises feature point data that is not on a collision course with the mobility.

4. The method of claim 3, wherein:
   a specification of the mobility is stored in the memory; and
   the non-collision 3D feature point data is selected based on the specification of the mobility.

5. The method of claim 1, wherein prior to reducing the dimension of the 3D feature point data to the 2D feature point data, the method further comprises:
   clustering the 3D feature point data; and
   deleting from the 3D feature point data an outlier feature point that is not clustered.

6. The method of claim 1, wherein, in a case in which the feature point data bound to the LiDAR point data and published on the local map deviates from a camera view, the feature point data bound to the LiDAR point data is not deleted from the local map.

7. The method of claim 1, wherein, in a case in which a distance between the mobility and the feature point data bound to the LiDAR point data and published on the local map is greater than or equal to a predetermined distance, the feature point data bound to the LiDAR point data and published on the local map is deleted from the local map.

8. The method of claim 1, wherein, in a case in which power of the mobility is turned off, the feature point data bound to the LiDAR point data and published on the local map is deleted from the local map.

9. A system of generating a local map for travel control of a mobility, the system comprising:
   a light detection and ranging (LiDAR) mounted on the mobility and configured to detect a two-dimensional (2D) LiDAR point data;
   a camera mounted on the mobility and configured to acquire a front image of the mobility; and
   a controller configured to:
      load the local map from an entire map stored in a memory, wherein the local map is at least a portion of the entire map;
      receive the 2D LiDAR point data from the LiDAR;
      receive the front image from the camera;
      acquire a three-dimensional (3D) feature point data in the front image;
      reduce a dimension of the 3D feature point data to a 2D feature point data;
      bind the 2D feature point data to the 2D LiDAR point data; and
      publish the 2D feature point data bound to the 2D LiDAR point data on the local map.

10. The system of claim 9, wherein the controller is further configured to generate a path of the mobility by using the local map on which the 2D feature point data bound to the 2D LiDAR point data is published.

11. The system of claim 9, wherein the controller is further configured to delete a non-collision 3D feature point data from the 3D feature point data before the dimension of the 3D feature point data is reduced to the 2D feature point data, wherein the non-collision 3D feature point data is feature point data that is not on a collision course with the mobility.

12. The system of claim 11, wherein:
   a specification of the mobility is stored in the memory; and
   the controller is further configured to select the non-collision 3D feature point data based on the specification of the mobility.

13. The system of claim 9, wherein, prior to the dimension of the 3D feature point data being reduced to the 2D feature point data, the controller is further configured to cluster the 3D feature point data and delete from the 3D feature point data an outlier feature point that is not clustered.

14. The system of claim 9, wherein, in a case in which the feature point data bound to the LiDAR point data and published on the local map deviates from a camera view, the controller is further configured to not delete the feature point data bound to the LiDAR point data and published on the local map from the local map.

15. The system of claim 9, wherein, in a case in which a distance between the mobility and the feature point data bound to the LiDAR point data and published on the local map is greater than or equal to a predetermined distance, the controller is further configured to delete the feature point data bound to the LiDAR point data and published on the local map from the local map.

16. The system of claim 9, wherein, in a case in which power of the mobility is turned off, the controller is further configured to delete the feature point data bound to the LiDAR point data and published on the local map from the local map.

17. A mobility comprising:
a light detection and ranging (LiDAR) mounted on the mobility and configured to detect a two-dimensional (2D) LiDAR point data;
a camera mounted on the mobility and configured to acquire a front image of the mobility;
one or more processors coupled to the mobility; and
a storage device storing a program to be executed by the one or more processors, the program including instructions to:
load a local map from an entire map stored in the storage device, wherein the local map is at least a portion of the entire map;
receive the 2D LiDAR point data from the LiDAR;
receive the front image from the camera;
acquire a three-dimensional (3D) feature point data in the front image;
reduce a dimension of the 3D feature point data to a 2D feature point data;
bind the 2D feature point data to the 2D LiDAR point data; and
publish the 2D feature point data bound to the 2D LiDAR point data on the local map.

18. The mobility of claim 17, wherein the program further includes instructions to generate a path of the mobility by using the local map on which the 2D feature point data bound to the 2D LIDAR point data is published.

19. The mobility of claim 17, wherein, prior to the dimension of the 3D feature point data being reduced to the 2D feature point data, the program further includes instructions to:
delete a non-collision 3D feature point data from the 3D feature point data, wherein the non-collision 3D feature point data is feature point data that is not on a collision course with the mobility; and
cluster the 3D feature point data and delete from the 3D feature point data an outlier feature point that is not clustered.

20. The mobility of claim 17, wherein the program further includes instructions to:
not delete the feature point data bound to the LiDAR point data and published on the local map from the local map in a case in which the feature point data bound to the LiDAR point data and published on the local map deviates from a camera view;
delete the feature point data bound to the LiDAR point data and published on the local map from the local map in a case in which a distance between the mobility and the feature point data bound to the LiDAR point data and published on the local map is greater than or equal to a predetermined distance; and
delete the feature point data bound to the LiDAR point data and published on the local map from the local map in a case in which power of the mobility is turned off.

* * * * *